United States Patent
Eberle

(10) Patent No.: US 9,776,734 B2
(45) Date of Patent: Oct. 3, 2017

(54) LANDING AID METHOD AND DEVICE FOR AN AIRCRAFT

(71) Applicant: Airbus Operations (S.A.S.), Toulouse (FR)

(72) Inventor: Matthias Eberle, Tournefeuille (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 0 days.

(21) Appl. No.: 14/750,688

(22) Filed: Jun. 25, 2015

(65) Prior Publication Data

US 2016/0046386 A1   Feb. 18, 2016

(30) Foreign Application Priority Data

Jul. 4, 2014 (FR) .................................... 14 56427

(51) Int. Cl.
*B64D 45/08* (2006.01)
*G05D 1/06* (2006.01)
(Continued)

(52) U.S. Cl.
CPC ............ *B64D 45/08* (2013.01); *G01C 9/005* (2013.01); *G01C 21/20* (2013.01); *G01C 23/00* (2013.01);
(Continued)

(58) Field of Classification Search
CPC ........ B64D 45/04; B64D 45/08; G01C 23/00; G01C 21/20; G01C 9/005; G08G 5/02; G08G 5/025; G08G 5/0021; G05D 1/0676
See application file for complete search history.

(56) References Cited

U.S. PATENT DOCUMENTS 4,040,005 A * 8/1977 Melvin ..................... G06G 7/78
244/181
4,057,782 A * 11/1977 Muller ................. G01C 23/005
244/137.1
(Continued)

FOREIGN PATENT DOCUMENTS

EP   0 708 393   4/1996
EP   2 498 159   9/2012
(Continued)

OTHER PUBLICATIONS

Preliminary Search Report for French Application No. 1456427 dated Mar. 10, 2015.

*Primary Examiner* — Genna Mott
(74) *Attorney, Agent, or Firm* — Jenkins, Wilson, Taylor & Hunt, P.A.

(57) ABSTRACT

A landing aid method and device for an aircraft including a unit for calculating automatically in a repetitive manner, during a final approach of the aircraft with a view to landing on a landing runway, using at least a ground speed of the aircraft, a height of the aircraft in relation to the ground, and a target vertical speed representing a vertical speed required on contact with the landing runway, a slope angle of a flight path allowing the aircraft to perform a flare, checking at least the target vertical speed on contact with the landing runway, and a unit for displaying automatically, on at least one screen of the flight deck of the aircraft, a first symbol illustrating the current slope angle of the aircraft and a second symbol illustrating the calculated slope angle.

10 Claims, 4 Drawing Sheets

(51) Int. Cl.
*G08G 5/00* (2006.01)
*G08G 5/02* (2006.01)
*G01C 9/00* (2006.01)
*G01C 21/20* (2006.01)
*G01C 23/00* (2006.01)

(52) U.S. Cl.
CPC ......... *G05D 1/0676* (2013.01); *G08G 5/0021* (2013.01); *G08G 5/025* (2013.01)

(56) References Cited

U.S. PATENT DOCUMENTS

| | | | | |
|---|---|---|---|---|
| 4,357,661 | A * | 11/1982 | Lambregts | G05D 1/0676 244/183 |
| 4,368,517 | A * | 1/1983 | Lovering | G01C 23/005 340/972 |
| 4,554,545 | A * | 11/1985 | Lowe | G01C 23/00 340/951 |
| 5,808,563 | A * | 9/1998 | Ching | G05D 1/0676 340/971 |
| 8,240,615 | B2 | 8/2012 | Dal Santo et al. | |
| 8,374,736 | B1 | 2/2013 | Rupnik | |
| 8,660,722 | B2 | 2/2014 | Dumoulin et al. | |
| 8,831,799 | B1 * | 9/2014 | Levine | G05D 1/0676 244/183 |
| 9,058,743 | B2 | 6/2015 | Bourret et al. | |
| 2013/0103233 | A1 * | 4/2013 | Bourret | B64D 45/04 701/18 |

FOREIGN PATENT DOCUMENTS

| | | |
|---|---|---|
| FR | 2 920 231 | 2/2009 |
| FR | 2 981 778 | 4/2013 |

* cited by examiner

LANDING AID METHOD AND DEVICE FOR AN AIRCRAFT

CROSS-REFERENCE TO RELATED APPLICATION

This application claims the benefit of and priority to French patent application no. 14 56427 filed on Jul. 4, 2014, the entire disclosure of which is incorporated by reference herein.

TECHNICAL FIELD

The disclosure herein relates to a landing aid method and device for an aircraft, in particular a transport aircraft.

BACKGROUND

The present disclosure applies to a landing aid device intended to provide aid with the guidance of the aircraft, to help the pilot to manually perform the flare, during a landing, just before touching the landing runway or the ground for an emergency landing.

It is known that, toward the end of the final approach with a view to landing, the aircraft is normally in a stabilized descent. After passing through a flare-triggering height, the pilot must reduce vertical speed before touching the ground to ensure the comfort of passengers and prevent any damage to the aircraft structure.

This maneuver is difficult to accomplish due to its short duration, generally in the order of five seconds for transport aircraft, during which a dynamic manoeuver close to the ground must therefore be performed. A maneuvering error may result in a hard landing or an excessively long landing distance.

Management of the flare using a head-up display (HUD) enables this risk to be reduced. In this case, the pilot guides the aircraft manually so that the speed vector of the aircraft displayed on the screen follows a flare guidance target also displayed on the screen.

Moreover, it should be noted that, due to the existence at airports of non-horizontal landing runways, i.e. having non-zero slopes, the flare maneuver must be capable of being adapted to landing runways of this type.

From document FR2.981.778, an automatic landing device of an aircraft, in particular a transport aircraft, is known which enables the implementation of an automatic landing on a landing runway having a high slope value.

However, this automatic device is not usable in all circumstances.

Similarly, the taking into account of a flare maneuver guidance signal based on information originating from such an automatic landing device is not optimal.

In fact, the flare guidance target (in accordance with a guidance signal of this type) typically moves on the screen by minimizing the deviation of the aircraft in relation to a reference flare trajectory. Due to this minimization, the system does not ensure a convergence of the guidance target toward a slope corresponding to a vertical speed required on contact with the landing runway. The use of a guidance symbol of this type originating from an autopilot to aid the pilot in performing the flare manually is therefore not optimal.

SUMMARY

The present disclosure relates to a landing aid method for an aircraft, in particular a transport aircraft, which enables this disadvantage to be overcome.

According to the disclosure herein, the method includes steps which, in an automatic and repetitive manner, during a final approach of an aircraft with a view to landing on a landing runway, comprise:

a) receiving the current values of a plurality of parameters, including a ground speed of the aircraft and a height of the aircraft in relation to the ground;

b) calculating a slope angle of a flight path of the aircraft, using at least these current values and at least a target vertical speed, the target vertical speed representing a vertical speed required on contact with the landing runway, this flight path allowing the aircraft to perform a flare, checking at least the target vertical speed on contact with the landing runway; and c) displaying, on at least one screen of the flight deck of the aircraft, a first symbol illustrating the current slope angle of the aircraft and a second symbol illustrating the slope angle of the flight path, calculated in step b).

Thus, by the disclosure herein, the pilot is guided so that he makes the aircraft follow (through manual control) a flight path which allows the aircraft to reach the point of contact at the target vertical speed. As described below, the second symbol (illustrating the calculated slope angle of the flight path) regularly converges toward a slope corresponding to a vertical speed required on contact with the landing runway, which enables the aforementioned disadvantage to be overcome.

Furthermore, step a) advantageously includes a sub-step comprising determining a slope value of the landing runway, and step b) comprises calculating the slope angle of the flight path using this slope value of the landing runway. In this case, this sub-step of step a) preferably takes into account at least one of the following slope values:

- a slope value input by a member of the crew of the aircraft;
- a slope value corresponding to that of the landing runway used for the landing, this slope value being extracted automatically from an on-board database; and
- a slope value measured using at least one on-board measuring device.

Furthermore, the method advantageously includes an additional step comprising monitoring the slope value of the landing runway, determined in step a) in such a way as to be able to detect an incorrect slope value.

Moreover, the method advantageously includes an additional step comprising, in the event of detection of an incorrect slope value, in automatically performing at least one of the following operations:

- emitting an alarm signal in the flight deck of the aircraft;
- correcting the incorrect slope value;
- using a default slope value in step b);
- deactivating at least the display of the second symbol;
- supplying the crew with information relating to the origin of a fault having resulted in the incorrect slope value and relating to actions to be taken.

Moreover, the method reveals at least some of the following characteristics, taken individually or in combination:

- the method includes a step of generating a control parameter suitable for modifying the shape of the flight path, this control parameter being used in step b) to calculate the slope angle;
- step a) also comprising receiving a target vertical acceleration representing a vertical acceleration required on contact with the landing runway, and step b) comprising calculating the slope angle of the flight path also using this target vertical acceleration.

The present disclosure also relates to a landing aid device for an aircraft.

According to the disclosure herein, this device comprises:
- at least one data-receiving unit configured to receive automatically, during a final approach of the aircraft with a view to a landing on a landing runway, the current values of a plurality of parameters, including a ground speed of the aircraft and a height of the aircraft in relation to the ground, and also at least one target vertical speed representing a vertical speed required on contact with the landing runway;
- a calculation unit configured to calculate automatically, at least using these current values and the target vertical speed, a slope angle of a flight path, this flight path enabling the aircraft to perform a flare, checking at least the target vertical speed on contact with the landing runway; and
- a display unit configured to display automatically, on at least one screen of the flight deck of the aircraft, a first symbol illustrating the current slope angle of the aircraft and a second symbol illustrating the slope angle of the flight path, calculated by the calculation unit.

Moreover, the device advantageously comprises in addition:
- at least a first additional unit configured to determine a slope value of the landing runway, the calculation unit being configured to calculate the slope angle of the flight path using this slope value of the landing runway;
- at least a second additional unit configured to monitor automatically the slope value of the landing runway in such a way as to be able to detect an incorrect slope value;
- automatic devices, structures or operations to perform at least one of the following operations in the event of detection of an incorrect slope value:
  - emitting an alarm signal in the flight deck of the aircraft;
  - correcting the incorrect slope value;
  - using a default slope value;
  - deactivating at least the display of the second symbol;
  - supplying the crew with information relating to the origin of the fault having resulted in the incorrect slope value and relating to actions to be taken.

The present disclosure also relates to an aircraft, in particular a transport aircraft, which includes a device of the aforementioned type.

BRIEF DESCRIPTION OF THE DRAWINGS

The attached figures illustrate how the disclosure herein can be implemented. In these figures, identical references denote similar elements.

DETAILED DESCRIPTION

Figure 1:
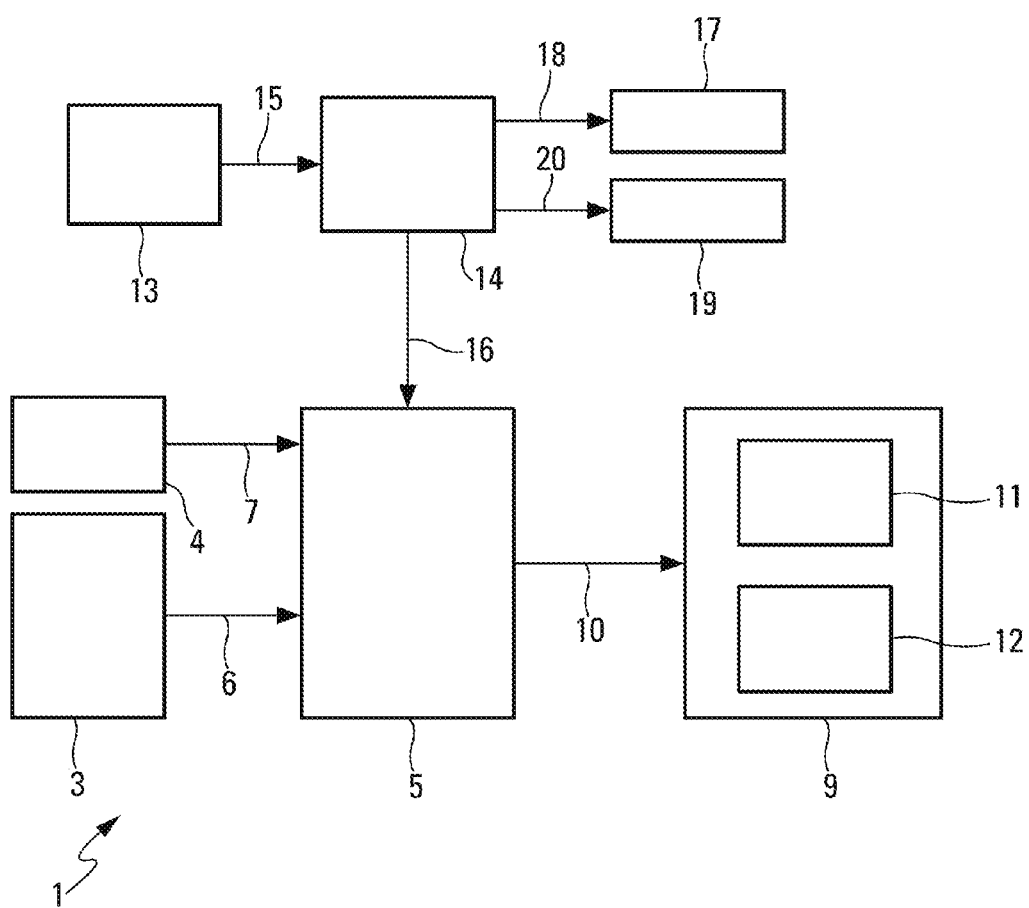
FIG. 1 is a synoptic diagram of a landing aid device illustrating the disclosure herein.

The device 1 shown schematically in FIG. 1 and illustrating the disclosure herein is a landing aid device of an aircraft AC, in particular a transport aircraft. This device is intended, notably, to help a pilot in manually controlling a flare maneuver during a landing, just before touching the landing runway 2, as shown in FIG. 2.

Figure 2:
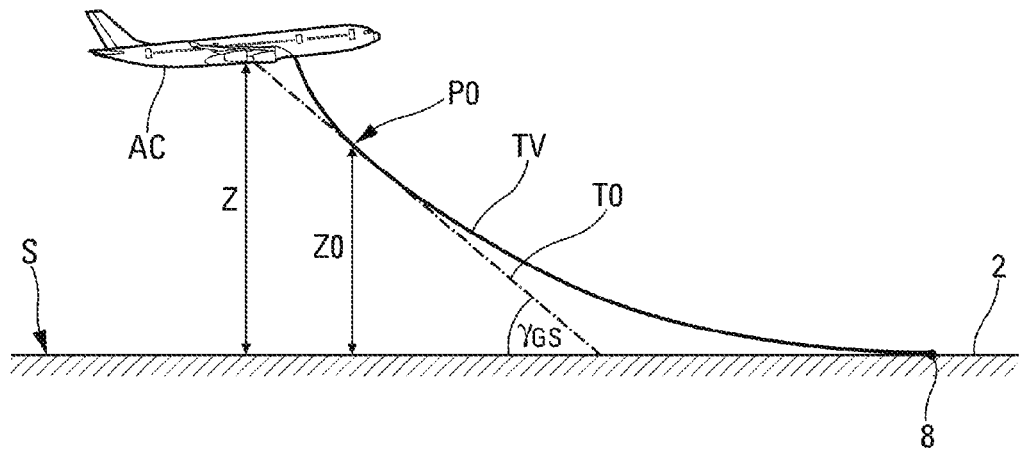
FIG. 2 illustrates schematically a landing of an aircraft with a flare phase.

The device 1 comprises:
- a unit 3 to generate, in an automatic and repetitive manner, the current values of a plurality of parameters of the aircraft AC, including a ground speed Vgnd of the aircraft AC and a height Z of the aircraft AC in relation to the ground S (FIG. 2); and
- a man/machine interface 4, for example a touch screen, a keyboard, a pointing device or any other conventional approach which enables an operator to input data into the device 1, and at least one target vertical speed Vtgt representing a vertical speed required for the aircraft AC at the time of contact with (or touching of) the landing runway 2 (at a point 8 in FIG. 2).

According to the disclosure herein, the device 1 also comprises:
- a calculation unit 5 which is connected via links 6 and 7 (forming part of a data-receiving unit) to the unit 3 and to the interface 4 respectively, and which is formed in such a way as to calculate, in an automatic and repetitive manner, at least using the current values received from the unit 3 and the target vertical speed Vtgt received from the interface 4, a slope angle $\gamma c$ of a flight path TV. This flight path TV (i.e. a landing path) is defined in such a way as to allow the aircraft AC to perform a flare, checking at least the target vertical speed Vtgt on contact with the landing runway 2, as described above; and
- a display unit 9 which is connected via a link 10 to the calculation unit 5 and which is formed in such a way as to display, on at least one screen 11, 12 of the flight deck of the aircraft AC, a symbol S1 illustrating the current slope angle $\gamma$ of the aircraft AC and a symbol S2 illustrating the slope angle $\gamma c$ of the flight path TV, calculated by the calculation unit 5, as shown in FIG. 3.

To do this, the current slope angle $\gamma$ of the aircraft AC is also received from conventional structure forming part of the unit 3.

Figure 3:
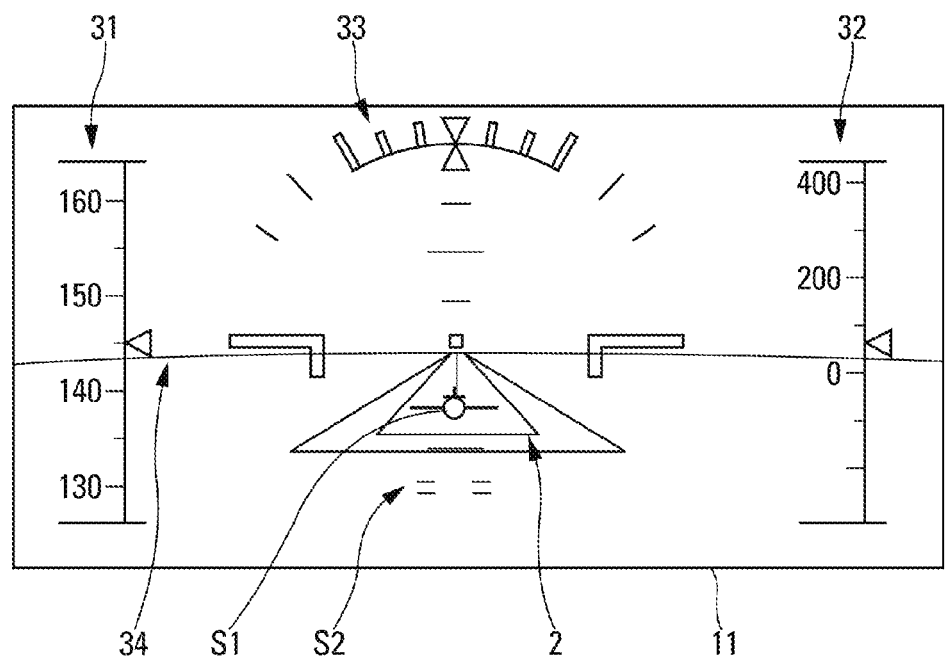
FIG. 3 shows schematically an example of a head-up display of a landing aid device.

To implement the display, the device 1 includes at least one of the following screens:
- a head-up display (HUD) screen 11 to implement a display in accordance with the external environment seen through this display screen 11, as shown in FIG. 3;
- a head-down display screen 12, in particular a primary flight display (PFD) screen.

The head-up display screen 11, shown by way of example in FIG. 3, includes, in a conventional manner, the following elements which are not further described:
- a conventional altitude scale 32;
- a conventional speed scale 31;
- a conventional roll scale 33; and
- a line 34 representing the horizon.

Furthermore, in the example shown in FIG. 3, the landing runway 2 used during the current landing can be seen on the display screen 11. The symbol S1 illustrating the current slope angle γ of the aircraft AC and the symbol S2 illustrating the slope angle γc of the flight path TV, calculated by the calculation unit 5 (and received via the link 10) are also shown on this display screen 11.

Figure 4:
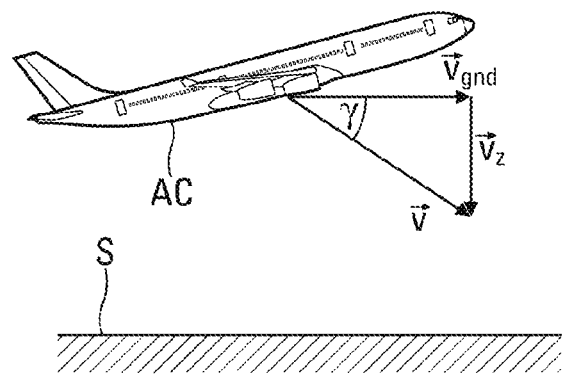
FIG. 4 is a diagram illustrating different speed parameters of an aircraft.

The current slope angle γ of the aircraft AC is the angle between the current speed vector $\vec{V}$ of the aircraft AC, which is formed from the ground speed vector $\vec{V}$gnd and the vertical speed vector $\vec{V}$z, and the horizontal (the direction of which is indicated by the ground speed vector $\vec{V}$gnd, as shown in FIG. 4.

The symbol S2 is displayed before the initiation of the flare under the symbol S1 as shown in FIG. 3, and it increases toward a target slope angle γctgt on impact (by moving upward on the display).

The flare must be initiated when the symbol S2 (which therefore approaches the symbol S1) reaches the level of the symbol S1. The pilot's task is then to follow the symbol S2 with the symbol S1, using appropriate controls of a conventional control stick of the aircraft AC.

The path TV is recalculated continuously, except, for example, in the case of an autopilot where a single fixed path is retained until impact. The path TV thus supplies a valid reference until impact, even if the aircraft AC has already passed the initially envisaged point of impact.

The device 1 thus uses only a single flight path TV which guides the aircraft AC in a reliable manner toward a predefined vertical speed target (Vtgt) and, according to the path type, also a vertical acceleration target (atgt), as explained below.

The guidance path TV shown in FIG. 2 is calculated by the calculation unit 5 on the basis of the targeted impact conditions at the point of impact 8 (given by the target vertical speed and, possibly, by the target vertical acceleration), rearward toward the aircraft AC. Different methods of calculating the slope angle γc are described below. Thus, the control of the slope angle γc (which is determined for the current height Z of the aircraft AC) guarantees the guidance toward the targeted impact conditions.

As can be seen in FIG. 2, before attaining the flare initiation height Z0 (where the path TV is tangential to a stable descent along an axis T0 shown by broken lines, established by the pilot), the slope angle of the path TV is steeper than the slope angle γGS, for example 3°, of this axis T0, entered by the pilot.

Figure 5:
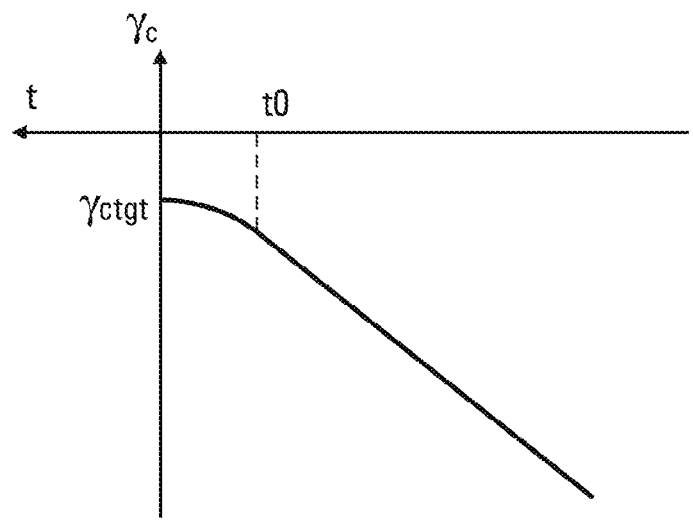
FIG. 5 is a graph showing the change over time of a calculated slope angle.

The slope angle γc then converges gently toward the target slope angle γctgt, as also shown in FIG. 5, t0 being the flare-triggering time (at the point P0 in FIG. 2).

The observation of the movement of the symbol S2 on the screen 11 and/or on the screen 12 thus allows the pilot:
to better anticipate the flare initiation time by estimating the time when the symbol S2 will reach the symbol S1;
to know by how much he must pull on the control stick on initiation of the flare; and
to obtain a visual indication for landing, during a head-up display.

The device 1 therefore enables a reduction in the workload of the pilot and provides him with an increased awareness of the situation.

The device 1 as described above offers many other advantages. In particular:
it is easily implementable in a display system, notably an HUD;
it operates for all slope angles and all ground speeds, without requiring complex adaptations;
it is resilient to system faults, due to its reduced number of inputs; and
it is adaptable to any aircraft type, due to the reduced number of characteristic parameters used.

Figure 6:
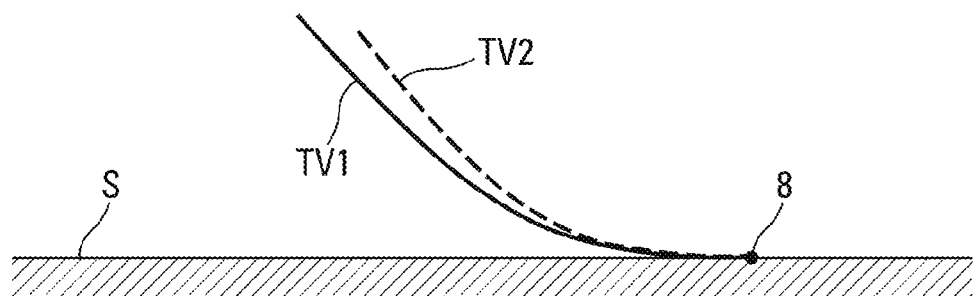
FIG. 6 illustrates schematically two landing path parts, defined respectively on the basis of different control parameters.

In one particular embodiment, the device 1 is configured for and can generate a control parameter τ. This may notably be the interface 4 which allows a pilot to enter a control parameter τ. This control parameter τ is used by the calculation unit 5 to calculate the slope angle γc, as explained below. This control parameter τ is suitable for modifying the shape of the flight path, as shown in FIG. 6 for two paths TV1 and TV2 defined on the basis of two different control parameters.

In one particular embodiment, the interface 4 also allows the provision of a target vertical acceleration atgt representing a vertical acceleration of the aircraft AC required on contact with the landing runway 2. In this particular embodiment, the calculation unit 5 calculates the slope angle γc of the flight path TV also using this target vertical acceleration atgt, as explained below.

Moreover, in one preferred embodiment the device 1 additionally includes, as shown in FIG. 1, an assembly (or unit) 13 which determines the slope value of the landing runway 2 (i.e. the angle between the runway 2 and the horizontal), at least for the part of the runway 2 where the flare must be implemented (typically between 60 meters downstream of the runway threshold 2 and the maximum zone of impact of the wheels, generally 823 m downstream of the threshold). This slope value is automatically transmitted to the calculation unit 5. The calculation unit 5 is configured to calculate the slope angle γc of the flight path TV using this slope value of the landing runway 2.

This preferred embodiment also provides a compensation for non-zero runway, and notably steep slopes.

The device 1 is thus capable of providing a flare guidance based on the flight path TV for runways having any type of slope.

The device 1 receives a numeric value for the slope of the runway at the targeted impact position and consequently corrects the control of the slope angle γc of the flight path TV in order to provide a visual guidance which even takes account of steep runway slopes. The slope value is available before the initiation of the flare and remains constant or at least stable until the impact.

In the context of the present disclosure, the assembly 13 may comprise different approaches or techniques for determining the slope value.

In a first embodiment, the assembly 13 may comprise an interface, notably an interface already present on the aircraft AC, for example the interface 4, which allows a pilot to input manually the mean slope of the runway 2 (in the runway portion where the flare takes place). This datum is available on some approach charts or, failing that, can be prepared in advance for the ground on which the aircraft AC is likely to be operated.

In another embodiment of the disclosure herein, the device 1 contains, via a flight management system (FMS) or any other equivalent system, a database which associates a slope value with each runway 2. In this embodiment, when the pilot chooses, from the FMS system, the runway on which he wishes to land, the FMS system automatically supplies the necessary slope value and no additional intervention is required on the part of the crew, thus reducing the workload of the crew compared with the aforementioned first embodiment.

In one variant of this last embodiment, the database may contain the profile of the entire runway 2 (and not the mean slope of the runway in the runway portion where the flare takes place). In this case, the slope value necessary for the calculation unit 5 (i.e. the mean slope in the flare implementation part) is simply extracted from the information contained in this database. This variant enables a precise slope value to be obtained.

Figure 7:
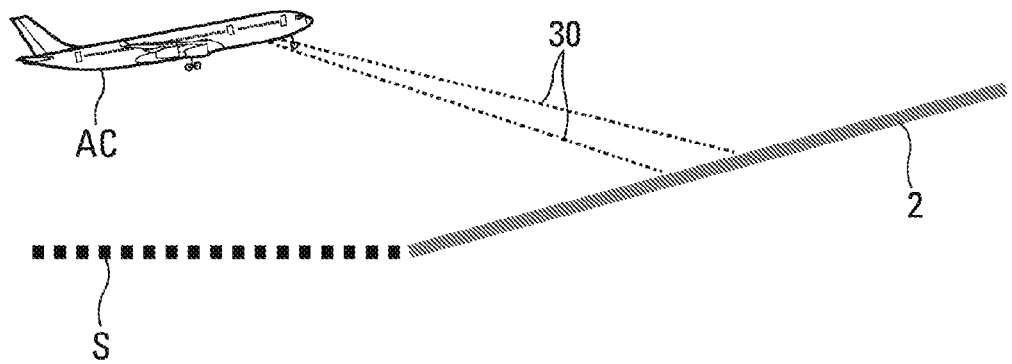
FIG. 7 shows schematically a distance measurement of a landing runway, in front of the aircraft.

In another embodiment of the disclosure herein, the assembly 13 comprises at least one specific sensor which is mounted on-board the aircraft AC, for example in the nose landing gear, and which is intended to measure the slope value of the runway 2. This sensor (which forms, for example, part of the unit 3) may be of the "radar" type operating in the radio domain, or of the "Lidar" type, based on laser measurements, or it may correspond to a laser rangefinder. This sensor performs distance measurements in front of the aircraft AC, as shown in FIG. 7 by rectilinear beams 30 which are emitted by the sensor and are reflected by the runway 2 in such a way that their distance can be determined. By knowing the angle between the two beams 30, the slope value of the runway 2 can be calculated. In this embodiment, no intervention is required on the part of the crew, and the assembly 13 can operate even on a runway which is not present in the aforementioned database of the FMS system, or in the event of failure of the latter.

In another embodiment of the disclosure herein, the assembly 13 includes a plurality of the embodiments described above, which enables a slope value to be supplied to the calculation unit 5, regardless of the fault events (notably in the FMS system), including for runways not referenced in the databases of the FMS system, or for runways for which the required information is not available on the approach charts.

In all of the embodiments of the disclosure herein which enable a slope value of the runway 2 to be determined and supplied to the calculation unit 5, a risk exists that the information supplied is incorrect. The term "incorrect" is understood to mean available information which is different from the real value, regardless of the reasons that have resulted in this situation.

In order to overcome this disadvantage, the device 1 includes a monitoring assembly (or unit) 14. This assembly 14 includes monitoring (not shown) which is intended to implement a monitoring in such a way as to be able to detect an incorrect value for the slope value received (via a link 15) from the assembly 13, before transmitting it, if necessary, to the calculation unit 5 (via a link 16).

In a first embodiment, the assembly 14 includes a detector for detecting, during at least a predetermined time period, a deviation between the slope value provided for the calculation unit 5 and a slope value measured directly or determined by measurements.

Figure 8:
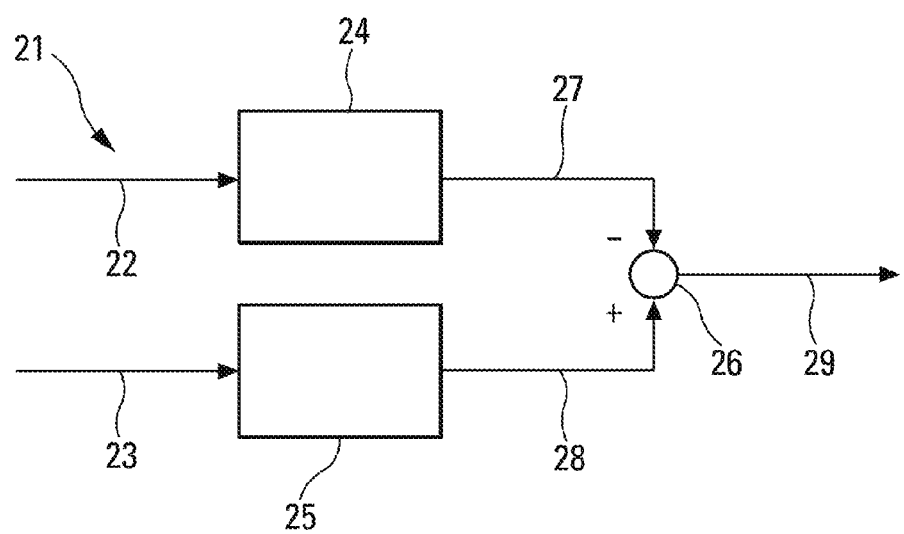
FIG. 8 is the synoptic diagram of a calculation unit or elements of the device shown in FIG. 1.

In this case, the assembly 14 includes estimator 21, shown in FIG. 8, for carrying out an estimation of the real slope of the runway which is based on the comparison between the value supplied by a radio altimeter of the aircraft AC and an inertial vertical speed of the aircraft AC, which are obtained in a conventional manner from means of the unit 3. Estimator 21 allows the vertical speed in relation to the runway to be calculated.

As shown in FIG. 8, estimator 21 is configured to:
receive a height value supplied by the radio altimeter via a link 22 and an inertial vertical speed supplied by an inertial unit via a link 23;
submit the height value to a high-pass filter 24 and the inertial vertical speed to a low-pass filter 25; and
using a calculation element 26, calculate the difference between the results of the filters 24 and 25 received via links 27 and 28 respectively and supply the result, i.e. the vertical speed due to the slope of the runway, via a link 29.

On the basis of this datum, the assembly 14 can calculate the equivalent slope value in a conventional manner by using the ground speed of the aircraft AC. This equivalent slope value is then compared with the slope value to be monitored.

In another embodiment, the assembly 14 performs a correlation between the overflown ground profile, determined by the radio altimeter, and a ground profile stored in a database, notably of the FMS system. This embodiment is more resilient than the preceding embodiment compared to the runway profiles having significant slope changes in the flare area.

In another embodiment, the assembly 14 includes a comparer to carry out a comparison between the available slope value and a slope value originating from a sensor enabling a direct measurement of the latter, as indicated above with reference to FIG. 7. This solution enables an inconsistency to be detected sufficiently early before the overflight of the threshold of the runway 2.

Moreover, in a final embodiment of the disclosure herein, a plurality of the embodiments described above can be combined within the assembly 14.

Furthermore, if an incorrect slope value is detected by the assembly 14, the device 1 performs a least one of the following operations:
it emits an audible and/or visual alarm in the flight deck, using alarm 17 (which are, for example, connected via a link 18 to the assembly 14), in order to alert the pilots;
it supplies the crew, preferably via display 19 which, for example, forms part of the display unit 9, with information (received via a link 20) relating to the origin of the outage and to actions to be taken.

In one particular embodiment, the device 1 may also include approaches (not shown, which, for example, form part of the unit 5) for automatically performing one of the following operations in the event of detection by the assembly 14 of an incorrect slope value:
correcting the incorrect slope value or using a default slope value in such a way that the guidance display remains operational; or
deactivating the display of at least the symbol S2.

The calculations likely to be performed by the calculation unit 5 in order to determine the slope angle $\gamma c$ are described below. The calculation of this slope angle $\gamma c$ which is intended for flare guidance can be performed in different ways.

In the simplest embodiment, the calculation of the slope angle $\gamma c$ is performed solely on the basis of the following parameters:
the ground speed Vgnd of the aircraft AC;
the height Z of the aircraft AC in relation to the ground S; and
the target vertical speed Vtgt.

A control parameter $\tau$ can also be provided which allows the flight path TV to be adapted, for example in order to obtain a different flare initiation height or a different total landing distance. One or more control parameters can thus be provided.

In a first embodiment, the slope angle $\gamma c$ can be calculated by using an exponential path, on the basis of the following equation Eq 1:

$$\gamma c = \arctan((Vtgt/Vgnd) - (1/(\tau \cdot Vgnd)) \cdot Z)$$

An exponential path having the form $Z=a.e^{-t/\tau}+b$ provides the height Z as a function of the time t since the flare initiation. Its form may be adapted with the constants a, b, and τ. a and b are a function of τ, and also of the vertical speed on the initiation of the flare Vz0 and of the target vertical speed Vtgt respectively. Finally, the exponential path depends on the time t since the initiation of the flare, on the control parameter τ and on the limit conditions (Vz0 and Vtgt).

FIG. 6 shows the effect of the variation of the control parameter τ (the control parameter τ1 for the path TV1 is greater than the control parameter τ2 for the path TV2) for the same limit conditions Vz0 and Vtgt. At the beginning and at the end of the flare maneuver, the gradient of the path (which corresponds to the vertical speed) is identical, but the total flair duration, the landing distance and the flare initiation height have been reduced for the path TV2. Conversely, the vertical acceleration on impact is greater for the path TV2.

In another embodiment, the calculation of the slope angle γc can be carried out by using a path based on energy saving, on the basis of the following equation Eq 2:

$$\gamma c = \arctan(-(1/V gnd).\sqrt{Vtgt^2+2.atgt.Z})$$

In this embodiment, the impact condition can be defined by using, in addition to the target vertical speed Vtgt, also the target vertical acceleration atgt on impact.

Alternatively to the target vertical acceleration atgt, the slope angle variation rate γtgt on impact can be given by using the following approximation: $atgt=\gamma tgt.Vgnd$ The desired effect to follow γc is shown schematically in FIG. 5, taking into account a constant ground speed Vgnd.

Before reaching the flare initiation height Z0 at the time t0, the variation rate of the slope angle γc as a function of the time t must be linear in such a way that it is possible for the pilot to mentally deduce the extent of the deflection of the control stick necessary for initiating the flare. Just after the flare initiation, the variation rate of the slope angle γc must not change significantly. It converges regularly toward the target value γctgt ensuring the contact with the ground at the target vertical speed Vtgt (and, where appropriate, also with the target vertical acceleration atgt).

As indicated above, in one preferred embodiment, the glide path can be adapted to ascending or descending runways, descending runways reducing the load factor on impact and ascending runways increasing the load factor on impact.

If the pilot is able to follow the flare control exactly, the consequence of the flare guidance reference profile must be that the aircraft AC has an appropriate new target vertical speed Vtgt1 on impact. This target vertical speed Vtgt1 takes into account the load factor variations due to the slope value of the runway.

The value Vtgt1 then replaces the value Vtgt for the target vertical speed in the aforementioned equations Eq 1 and Eq 2.

More precisely, the slope angle γc can then be calculated:
A/ by using an exponential path, on the basis of the following equation Eq 3:

$$\gamma c = \arctan((Vtgt1/Vgnd)-(1/(\tau.Vgnd)).Z)$$

B/ by using a path based on energy saving, on the basis of the following equation Eq 4:

$$\gamma c = \arctan(-(1/Vgnd).\sqrt{Vtgt1^2+2.atgt.Z})$$

The impact will be harder with an ascending slope of the runway 2, as shown in FIG. 7. In this case, the target vertical speed of the guidance function must be reduced This is obtained simply by replacing the target vertical speed value Vtgt with a smaller (target vertical speed) value Vtgt1 in equation Eq 1 or Eq 2 (in order to obtain equation Eq 3 or Eq 4). This then allows the pilot to be guided toward a vertical speed generating an acceptable load factor on impact.

Conversely, for a descending slope of the runway 2, the target vertical speed value Vtgt can be replaced with a greater (target vertical speed) value Vtgt1 in equations Eq 1 and Eq 2 (in order to obtain equations Eq 3 and Eq 4).

The resulting load factor on impact is difficult to calculate because of a non-linear component due, inter alia, to the tires, the shock absorbers of the landing gear and the structure of the aircraft. It is known that an ascending runway slope increases the speed vector component perpendicular to the surface of the runway, and the opposite applies to a descending runway slope. The vertical speed required in order to ensure that the vertical speed component which is normal on the surface of the runway at the point of impact remains constant on impact can be determined.

Steeply ascending slopes may require the ground to be touched at a positive vertical speed (or climb rate) in order to ensure that the component remains constant. The corresponding control may consist in positioning the low point of the flare path a short time before impact. An appropriate energy management is necessary at this time. An appropriate flare guidance can be implemented by using a path with a vertex.

While at least one exemplary embodiment of the present invention(s) has been shown and described, it should be understood that modifications, substitutions and alternatives may be apparent to one of ordinary skill in the art and can be made without departing from the scope of the disclosure described herein. This application is intended to cover any adaptations or variations of the specific embodiments discussed herein. In addition, in this disclosure, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

The invention claimed is:

1. A landing aid method for an aircraft, comprising, in an automatic and repetitive manner, during a final approach of the aircraft with a view to landing on a landing runway:
    a) receiving current values of a plurality of parameters, including a ground speed of the aircraft and a height of the aircraft in relation to ground;
    b) calculating a slope angle of a flight path of the aircraft, using at least the current values of the ground speed of the aircraft and the height of the aircraft and at least a target vertical speed, the target vertical speed representing a vertical speed required on contact with the landing runway, wherein the flight path comprises a descent phase followed by a flare phase so that, if the aircraft follows the flight path, the aircraft will be descending at the target vertical speed on contact with the landing runway; and
    c) displaying, on at least one screen of the flight deck of the aircraft, and while the aircraft is in the descent phase of the flight path, a first symbol at a fixed location on the at least one screen and a second symbol as moving across the at least one screen in a direction towards the first symbol at a rate based on a variation rate of the slope angle of the flight path so that the second symbol reaches the fixed location of the first symbol in the direction across the at least one screen at a time for the aircraft to transition from the descent phase of the flight plan to the flare phase of the flight plan; and d) displaying, on the at least one screen of the flight deck of the aircraft, and while the aircraft is in the flare phase of the flight path, the first symbol illustrating a current slope angle of a current path of the aircraft by positioning the first symbol at a first distance in the direction across the at least one screen and the second symbol illustrating the slope angle of the flight path, calculated in step b), by positioning the second symbol at a second distance in the direction across the at least one screen.

2. The method as claimed in claim 1, comprising a step of determining a slope value of the landing runway, and wherein step b) comprises calculating the slope angle of the flight path using the slope value of the landing runway.

3. The method as claimed in claim 2, wherein determining the slope value of the landing runway takes into account at least one of the following slope values:
   a slope value input by a member of the crew of the aircraft;
   a slope value corresponding to that of the landing runway used for the landing, this slope value being extracted automatically from an on-board database; and
   a slope value measured using at least one on-board measuring device.

4. The method as claimed in claim 2, comprising an additional step of monitoring the slope value of the landing runway to detect an incorrect slope value.

5. The method as claimed in claim 4, comprising an additional step of, in the event of detection of an incorrect slope value, automatically performing at least one of the following operations:
   emitting an alarm signal in the flight deck of the aircraft;
   correcting the incorrect slope value;
   using a default slope value in step b);
   deactivating at least the display of the second symbol; and
   supplying the crew with information relating to the origin of a fault having resulted in the incorrect slope value and relating to actions to be taken.

6. The method as claimed in claim 1, comprising generating a control parameter suitable for modifying shape of the flight path, this control parameter being used in step b) to calculate the slope angle.

7. The method as claimed in claim 1, comprising receiving a target vertical acceleration representing a vertical acceleration required on contact with the landing runway, and wherein step b) comprises calculating the slope angle of the flight path also using this target vertical acceleration.

8. A landing aid device for an aircraft, the landing aid device comprising:
   at least one data-receiving unit to receive automatically, during a final approach of the aircraft with a view to a landing on a landing runway, the current values of a plurality of parameters, including a ground speed of the aircraft and a height of the aircraft in relation to the ground, and also at least one target vertical speed representing a vertical speed required on contact with the landing runway;
   a calculation unit configured to calculate automatically, at least using the current values of the ground speed of the aircraft and the height of the aircraft and the at least one target vertical speed, a slope angle of a flight path, wherein the flight path comprises a descent phase followed by a flare phase so that, if the aircraft follows the flight path, the aircraft will be descending at the at least one target vertical speed on contact with the landing runway; and
   a display unit configured to display automatically, on at least one screen of the flight deck of the aircraft, and while the aircraft is in the descent phase of the flight path, a first symbol at a fixed location on the at least one screen and a second symbol as moving across the at least one screen in the direction towards the first symbol at a rate based on a variation rate of the slope angle of the flight path so that the second symbol reaches the fixed location of the first symbol in the direction across the at least one screen at a time for the aircraft to transition from the descent phase of the flight plan to the flare phase of the flight plan, and to display on the at least one screen of the flight deck of the aircraft, and while the aircraft is in the flare phase of the flight path, the first symbol illustrating a current slope angle of a current path of the aircraft by positioning the first symbol at a first distance in the direction across the at least one screen and the second symbol illustrating the slope angle of the flight path, calculated in step b), by positioning the second symbol at a second distance in the direction across the at least one screen.

9. The landing aid device as claimed in claim 8, comprising at least a first additional unit configured to determine automatically a slope value of the landing runway, and wherein the calculation unit is configured to calculate the slope angle of the flight path using this slope value of the landing runway.

10. The landing aid device as claimed in claim 9, comprising at least a second additional unit configured to monitor automatically the slope value of the landing runway to detect an incorrect slope value.

* * * * *